(12) United States Patent
Sironi et al.

(10) Patent No.: US 10,468,147 B2
(45) Date of Patent: Nov. 5, 2019

(54) SEALING BOLT AND SEALING SYSTEM

(71) Applicant: The European Atomic Energy Community (EURATOM), represented by the European Commission, Brussels (BE)

(72) Inventors: Marco Sironi, Laveno-Mombello (IT); François Littmann, Cocquio Trevisago (IT)

(73) Assignee: THE EUROPEAN ATOMIC ENERGY COMMUNITY (EURATOM), Brussels (BE)

( * ) Notice: Subject to any disclaimer, the term of this patent is extended or adjusted under 35 U.S.C. 154(b) by 686 days.

(21) Appl. No.: 14/913,930

(22) PCT Filed: Jul. 25, 2014

(86) PCT No.: PCT/EP2014/066092
§ 371 (c)(1),
(2) Date: Feb. 23, 2016

(87) PCT Pub. No.: WO2015/024736
PCT Pub. Date: Feb. 26, 2015

(65) Prior Publication Data
US 2016/0217877 A1 Jul. 28, 2016

(30) Foreign Application Priority Data

Aug. 23, 2013 (EP) .................... 13181600

(51) Int. Cl.
*G21F 5/12* (2006.01)
*B65D 55/02* (2006.01)

(52) U.S. Cl.
CPC .............. *G21F 5/12* (2013.01); *B65D 55/028* (2013.01); *G21F 5/125* (2019.01); *Y10T 292/48* (2015.04);
(Continued)

(58) Field of Classification Search
CPC .............. Y10T 292/48; Y10T 292/509; Y10T 292/534; G21F 5/12; B65D 55/028
(Continued)

(56) References Cited

U.S. PATENT DOCUMENTS 999,891 A * 8/1911 Shepard ............ E05C 5/04
292/251
1,974,274 A * 9/1934 Hopkins ............ F16K 17/08
137/382
(Continued)

FOREIGN PATENT DOCUMENTS

| EP | 0658250 B1 | 1/1998 | |
| GB | 2067699 A * | 7/1981 | .............. F16B 1/021 |
| GB | 2067699 A | 7/1981 | |

OTHER PUBLICATIONS

International Search Report dated Nov. 19, 2014 re: Application No. PCT/EP2014/066092; pp. 1-3; citing: US 2009/235700 A1 and U.S. Pat. No. 4,729,626 A.
(Continued)

*Primary Examiner* — Carlos Lugo
(74) *Attorney, Agent, or Firm* — Cantor Colburn LLP

(57) ABSTRACT

A sealing bolt and a related system for sealing a container lid to a container body includes a seal stud mounted to the container body, a seal head connecting the container lid, and a pin connecting the seal head to the seal stud, where the container lid is connected to the container body by connecting the seal head to the seal stud, and a rupture cable is fed through a transverse passage in the pin and arranged such that any rotational or translational movement of the pin with respect to the seal head and/or the seal stud causes the rupture cable to break.

10 Claims, 1 Drawing Sheet

(52) U.S. Cl.
CPC ........ *Y10T 292/509* (2015.04); *Y10T 292/534* (2015.04)

(58) Field of Classification Search
USPC ...................................................... 292/307 R
See application file for complete search history.

(56) References Cited

U.S. PATENT DOCUMENTS

| | | | | |
|---|---|---|---|---|
| 2,016,797 | A * | 10/1935 | Burns | F16K 35/00 292/307 R |
| 2,033,371 | A * | 3/1936 | Benaggio | F16K 35/12 137/384 |
| 2,820,660 | A * | 1/1958 | Ainsworth | F16B 41/005 292/327 |
| 4,262,946 | A * | 4/1981 | Swisher | E05B 65/0089 292/307 R |
| 4,621,230 | A * | 11/1986 | Crouch | B25B 9/00 292/307 B |
| 4,729,626 | A | 3/1988 | Stieff | |
| 5,097,253 | A * | 3/1992 | Eschbach | G06K 19/07749 340/545.1 |
| 5,161,838 | A * | 11/1992 | Ely | F16B 21/186 292/327 |
| 6,000,736 | A * | 12/1999 | Leon | G09F 3/0352 24/909 |
| 6,007,121 | A * | 12/1999 | Dreisbach | G09F 3/0352 292/307 R |
| 6,069,563 | A * | 5/2000 | Kadner | G08B 13/06 340/539.1 |
| 6,390,519 | B1 * | 5/2002 | Dreisbach | G09F 3/0364 242/388.1 |
| 6,494,508 | B1 * | 12/2002 | Dreisbach | G09F 3/0352 292/307 A |
| 6,764,114 | B1 * | 7/2004 | Guillon | G07C 7/00 292/307 R |
| 6,791,465 | B2 * | 9/2004 | Blagin | F16B 41/005 340/539.1 |
| 7,178,841 | B1 * | 2/2007 | Moreno | G09F 3/0305 24/136 L |
| 7,471,203 | B2 * | 12/2008 | Worthy | G08B 13/1445 340/556 |
| 7,690,091 | B2 * | 4/2010 | Stobbe | A44B 15/00 24/704.1 |
| 8,087,705 | B2 * | 1/2012 | Littmann | F16B 41/005 292/251 |
| 8,186,731 | B1 * | 5/2012 | Romero | G09F 3/0358 292/307 B |
| 8,540,468 | B2 * | 9/2013 | Mekid | F16B 31/02 411/13 |
| 8,596,134 | B2 * | 12/2013 | Mekid | F16B 31/02 73/760 |
| 8,733,805 | B2 * | 5/2014 | Nazzari | G09F 3/0352 292/307 B |
| 2009/0235700 | A1 | 9/2009 | Sironi et al. | |

OTHER PUBLICATIONS

Written Opinion dated Nov. 19, 2014 re: Application No. PCT/EP2014/066092; pp. 1-4.

* cited by examiner

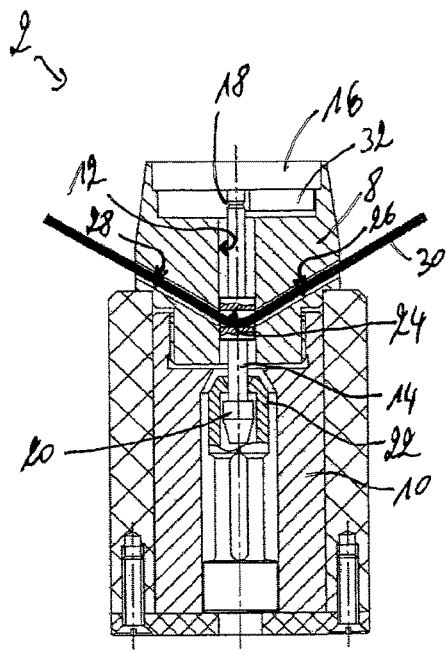
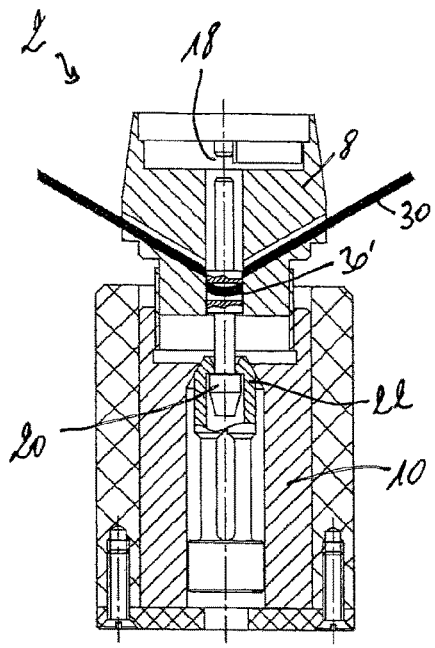
Fig. 1  Fig. 2
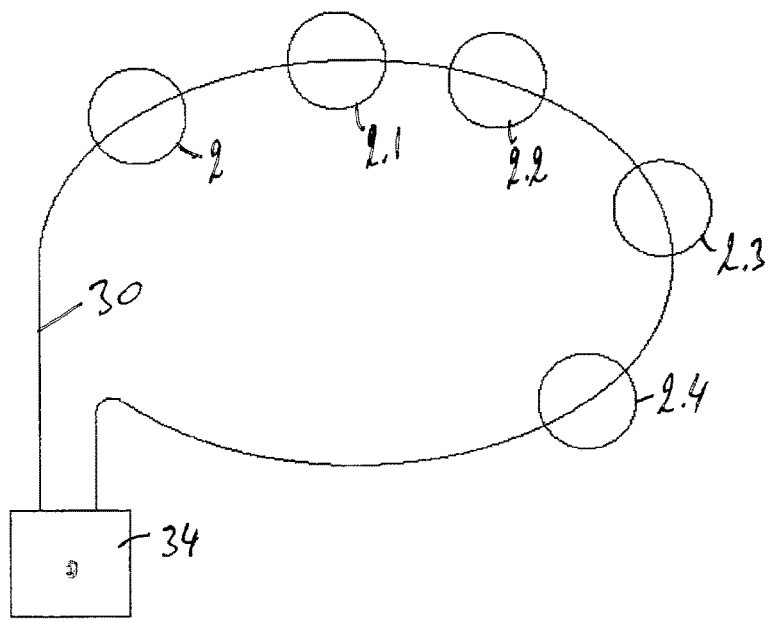
Fig. 3

SEALING BOLT AND SEALING SYSTEM

TECHNICAL FIELD

The present invention generally relates to sealing bolts, in particular for sealing nuclear containers. Such a sealing bolt securely connects a container lid to a container body and may comprise means for identifying the individual containers. The invention further relates to a sealing system comprising such sealing bolts.

BACKGROUND ART

Under some circumstances, the secure sealing of containers is necessary. It is of particular importance if such containers hold dangerous substances, such as for example fissile materials. In most cases, the container lid is connected to the container body by the use of at least one sealing bolt. Most often such a sealing bolt contains some kind of integrity element, breaking in case of violation and thereby revealing that the container may have been tampered with. Such a breakable integrity element can be concealed somewhere within the sealing bolt, which makes it more difficult to differentiate between standard sealing bolts and sealing bolts with additional security features. Thereby the number of sealing bolts with security features necessary to securely seal a container may be reduced.

An example of a sealing bolt in its most basic design is disclosed in GB-A-2067699. In one of the embodiments of the disclosure, the seal head is connected to its stud by a frangible integrity element that breaks at a given torque during the fastening process. However, the bolt head shows no evidence that the frangible element is broken and stays in its initial position on a plastic cup. If an attempt is made, to remove the sealing bolt, by turning its head, the plastic cup is visibly damaged, thus indicating tampering. The problem of such a bolt is that, once the frangible element is broken, it is difficult to remove the stud from the screw joint. However, once the sealing bolt is removed, it can be replaced with another bolt of the same type without revealing that the container has been tampered with.

To further increase the security of sealing bolts, an identification element may be concealed inside the sealing bolts so as to reveal if the initial sealing bolt has been replaced by another sealing bolt of the same type. If the identity of the sealing bolt is different and/or the integrity element is broken, the sealing device or/and the contents of the container may have been tampered with.

EP 0 658 250 B1 relates to a solution to univocally identify the sealing bolt by adding two ultrasonic elements to the breakable security element. Each ultrasonic element possesses one identification signal, wherein an overlap of the two identification signals provides a third identification signal. By comparison of the identification signals tampering can be revealed.

Even if the existing sealing bolts already seal the containers very securely, there still is a need not only to further improve the security, but also to reduce the maintenance effort necessary for the secure sealing of such containers.

BRIEF SUMMARY

A sealing bolt is provided herein with improved security features and of reduced maintenance effort. A sealing system for securely sealing containers is further provided herein.

The present invention relates to a sealing bolt for sealing a container lid to a container body. The sealing bolt comprises a seal stud mounted to the container body, a seal head connecting the container lid, and a pin connecting the seal head to the seal stud. The container lid is connected to the container body by connecting the seal head to the seal stud. According to an aspect of the present invention, a rupture cable is fed through a transverse passage in the pin and arranged such that any rotational or translational movement of the pin with respect to the seal head and/or the seal stud causes the rupture cable to break. The transverse passage in the pin may e.g. be embodied as a through hole or a groove and the rupture cable preferably is a fiber optic.

Thus, any attempt to remove the seal head causes the rupture cable to break. A broken rupture cable can be interpreted as a sign that the container may have been tampered with. On the other hand, as long as the rupture cable stays intact, closer inspection may not be necessary. This is of particular importance in case of if the container is arranged in an area of high risk, such as e.g. an irradiated area. If the rupture cable is intact, other security features may not need to be checked.

The seal head may further comprise a borehole, preferably in axial direction and a header plate. The pin may be connected to the header plate and pass through the borehole.

Preferably, the pin comprises an area of reduced thickness providing a weak point causing said pin to fail if a predetermined tensile stress or a predetermined sheer stress of said pin in said area of reduced thickness is reached. Such an area of reduced thickness may e.g. be arranged in proximity to the header plate, thereby causing the pin to break near the header plate, leavening the rest of the pin intact.

The seal stud can further comprise a clamping element connecting the pin to the seal stud to the pin and preventing the release of the pin. Such a clamping element provides a simple installation of the seal head to the seal stud since the pin can slide into the clamping element by applying a manual vertical force to the header plate and subsequently to the pin. Thereafter the pin cannot be released without destroying the integrity of the pin.

Preferably, the pin comprises a cone shaped end portion, thereby reducing the amount of vertical force needed to slide the end portion of the pin into the clamping element.

Advantageously, the seal head comprises lateral passages aligned with the transverse passage of the pin. These lateral passages are preferably arranged such that the rupture cable can be fed through one lateral passage, through the transverse passage of the pin and then through the other lateral passage.

Preferably, the passage of the pin is located under the surface area of the container lid, thereby eliminating the possibility of cutting the sealing bolt between the entry holes of the lateral passages and the surface area of the container lid without destroying its integrity.

The sealing bolt can further comprise identification means for verifying the identity of the pin and/or the sealing bolt. Such identification means may e.g. be ultrasonic elements or RFID-tags univocally identifying the sealing bolt, the container and its contents. The ultrasonic elements can further be used to monitor the integrity of the sealing bolt.

According to a preferred embodiment of the invention, at least one fiber optic connector is arranged at one of the two ends of the rupture cable.

The invention further relates to a sealing system for sealing a container lid to a container body. Such a sealing system comprises a plurality of sealing bolts with a connection cable arranged between the sealing bolts. The connection cable preferably is a fiber optic. A fiber optic reader is arranged and designed to detect the rupture of the rupture cable and/or connection cable.

Advantageously, the rupture cable and the connection cable are integrally formed so as to form a single fiber optic to optically couple the sealing bolts to the fiber optic reader.

Alternatively, the connection cable may be optically connected to the rupture cable by an optic fiber connector to optically couple the sealing bolts to the fiber optic reader. Preferably, the rupture cable has a fiber optic connector at both of its ends. In consequence, replacing a sealing bolt in a sealing system, which comprises a plurality of sealing bolts, is less time consuming since the sealing bolt can be disconnected from the connection cable by the fiber optic connectors.

The fiber optic reader is arranged and designed to detect the rupture of said rupture cable and/or connection cable. Such a fiber optic reader is capable of continuously monitoring the integrity of the rupture cable and/or connection cable. This system can be of reduced cost, since one fiber optic reader is necessary for the monitoring of the multiple sealing bolts. If any of the sealing bolts is tampered with, the rupture cable and/or connection cable is/are violated and the tampering is detected by the fiber optic reader.

The sealing system may further comprise communication means associated with the fiber optic reader, the communication means being arranged and designed for transmitting status information of the connection cable and/or rupture cable to a remote location. Thus a tampering attempt may be immediately detected and transmitted to a remote location immediately upon detection. The integrity of the container may thus be monitored in real-time from a remote location. The verification of the continuity of the connection cable and rupture cable is of particular interest when the container is arranged in an area of high risk, such as e.g. an irradiated area. As long as the connection cable and rupture cable remains intact, it can be assumed that the container has not been tampered with. Other security features, such as e.g. ultrasonic identification means or integrity features, may not need to be checked in the area of high risk. Indeed, these other security features may be checked, measured and recorded at the time of sealing of the container. Just before the container is to be opened, these other security features may be checked again. Periodic checks between the sealing and the opening of the container may, if desired, still be carried out. Such periodic checks can, thanks to the present invention, be carried out at greatly increased intervals, thereby avoiding exposing personnel unnecessarily to the dangers reigning in the area of high risk.

The communication means can comprise encryption means for encrypting the status information. Any information sent from the sealing system to the remote location may be carried out securely, thereby preventing others from interfering with the transmission of the status information.

BRIEF DESCRIPTION OF THE DRAWINGS

Further details and advantages of the present invention will be apparent from the following detailed description of several not limiting embodiments with reference to the attached drawings, wherein:

FIG. 1 is a cross sectional view through an assembled sealing bolt in accordance with an embodiment of the invention;

FIG. 2 is a cross sectional view through a violated sealing bolt of FIG. 1; and

FIG. 3 is a schematic view of a preferred embodiment of a sealing system.

DESCRIPTION OF PREFERRED EMBODIMENTS

FIG. 1 illustrates a preferred embodiment of a sealing bolt 2 in assembled state, wherein the sealing bolt 2 is sealing a container lid to a container body. The sealing bolt 2 comprises a seal head 8 and a seal stud 10, the latter being fixedly arranged in the container body. The seal head 8 comprises a borehole 12 arranged along a vertical axis of the seal head 8. This borehole 12 is dimensioned and arranged for receiving a pin 14 therethrough. The pin 14 is connected with its upper end to a header plate 16, which is in turn connected to the seal head 8. At its lower end, the pin 14 is connected to the seal stud 10.

The pin 14 comprises an area of reduced thickness 18 in which a rupture of the pin 14 is expected to occur when the seal head 8 is moved relative to the seal stud 10.

The lower end of the pin 14 comprises a cone shaped tip 20 designed to engage in a clamping element 22 associated with the seal stud 10. As shown in FIG. 1, the cone shaped tip 20 is designed to be forced into the clamping element 22. Once engaged in the clamping element 22, the pin 14 can no longer be removed without breaking the pin 14.

According to the present invention, the sealing bolt 2 further comprises a transverse passage 24 arranged through the pin 14 and two lateral passages 26, 28, which are designed to be in alignment with the transverse passage 24 when the sealing bolt 2 is assembled. As rupture cable, a fiber optic 30 is fed through the first lateral passage 26, the transverse passage 24 and the second lateral passage 28. This fiber optic 30 is used to not only verify the correct installation of the sealing bolt 2, but also the integrity of the sealing bolt 2.

It should be noted that the embodiment shown in the figures comprises a single fiber optic 30. In other words, the rupture cable arranged within the sealing bolt and the connection cable arranged between sealing bolts are integrally formed with one another. According to another embodiment, not shown in the figures, the rupture and connection cables can be separate lengths of fiber optic that are optically connected together by means of optic fiber connectors.

As can be seen from FIG. 2, which shows the sealing bolt 2 of FIG. 1 in a violated state, the removal of the seal head 8 causes the pin 14 to move with respect to the seal stud 10. As the cone shaped tip 20 of the pin 14 is however firmly engaged in the clamping element 22 of the seal stud 10, the translational movement of the pin 14 is limited. The pin 14 is ruptured in the area of reduced thickness 18. Consequently, the seal head 8 is allowed to move relative to the pin 14. Upon extraction of the seal head 8, the ruptured pin 14, which is still engaged in the clamping element 22 is left behind. This causes the transverse passage 24 of the pin 14 to be misaligned with the two lateral passages 26, 28. This, in turn, causes the fiber optic 30 to be broken. As seen in FIG. 2 the fiber optic 30 may be broken in two places and a portion 30' of the fiber optic 30 may be left within the pin 14.

The rupture of the fiber optic 30 is used to detect the opening of the sealing bolt 2 through the interruption of a signal passing through the fiber optic 30.

It should further be noted that a rupture of the fiber optic 30 occurs not only in case of a translational movement, but also in case of a rotational movement of the seal head with respect to the pin.

The seal head 8 is further provided with identification means 32, storing a univocal identity of the sealing bolt 2. Such identification means 32 may comprise means such as ultrasonic identity means or RFID tags.

In the installed sealing bolt 2, the location of the transverse passage 24 is preferably in a region located under the top surface of the container lid, thereby increasing the difficulty to remove the seal head 8 from the seal stud 10 without destroying the integrity of the optic fiber 30. After fully assembling the sealing bolt 2, the seal head 8 can no longer be released without destroying the integrity of the pin 14 and the fiber optic 30.

Additional sealing bolts can be added, thereby resulting in a sealing system as illustrated in FIG. 3. The fiber optic 30 is threaded through multiple sealing bolts 2, 2.1, 2.2, 2.3, 2.4 and thereafter both ends of the fiber optic 30 are fed to a fiber optic reader 34. The fiber optic reader 34 monitors the status of the fiber optic 30. Thanks to such an arrangement, it is possible to continuously monitor the status of different sealing bolts 2, 2.1, 2.2, 2.3, 2.4 by one fiber optic reader 34. Besides monitoring the status of the fiber optic 30, the fiber optic reader 34 can further transmit the status of the fiber optic 30 to a remote location using a suitable encryption code. With this improvement, the person only needs to get into the area of high risk, when installing the seal. All further checks can be carried out by the fiber optic. If there is a doubt in the readout of the fiber optic reader, or if the fiber optic reader indicates that the fiber optic has been ruptured, the status of the sealing bolts 2, 2.1, 2.2, 2.3, 2.4 can be checked additionally utilizing the ultrasonic identity means or RFID tags.

The invention claimed is:

1. Sealing bolt for sealing a container lid to a container body, said sealing bolt comprising:
    a seal head mounted to said container lid;
    a seal stud mounted to said container body;
    a pin configured to pass through the seal head and the seal stud, said pin comprising a header plate at one end coupled to said seal head, and an opposed end attached to a clamping means secured on the seal stud, so that the pin is configured to connect said seal head to said seal stud; and
    a cable arranged through a transverse passage in said pin, wherein said cable is a fiber optic, and
    wherein said seal head comprises lateral passages aligned with said transverse passage of said pin, arranged so as to pass said cable through said lateral passages and said transverse passage;
    wherein, if the seal head is pulled away from the seal stud, said pin is configured to rupture at a point adjacent the header plate, allowing said seal head to move relative to said pin and away from said seal stud, and misaligning said lateral passages and said transverse passage, allowing the rupture of said cable and providing indication of tampering.

2. Sealing bolt according to claim 1, wherein said pin comprises an area of reduced thickness thereby providing a weak point causing said pin to fail if a predetermined tensile stress or a predetermined sheer stress of said pin in said area of reduced thickness is reached.

3. Sealing bolt according to claim 1, wherein said pin comprises a cone-shaped end portion, said cone-shaped end portion engaging said clamping element of said seal stud.

4. Sealing bolt according to claim 1, further comprising an identification means, said identification means comprising one or more of the following:
    ultrasonic identification means;
    RFID-tag.

5. Sealing bolt according to claim 1, wherein said cable has two ends with at least one fiber optic connector arranged at one end.

6. Sealing system for sealing a container lid to a container body, said sealing system comprising:
    a plurality of sealing bolts according to claim 1;
    a connection cable arranged between said sealing bolts, wherein said connection cable is a fiber optic;
    a fiber optic reader arranged and designed to detect the rupture of said cable and/or said connection cable.

7. Sealing system according to claim 6, wherein said connection cable and said cable are integrally formed so as to form a single fiber optic.

8. Sealing system according to claim 6, wherein said connection cable is optically connected to said cable by an optic fiber connector.

9. Sealing system according to claim 6, further comprising communication means associated with said fiber optic reader, said communication means being arranged and designed for transmitting status information of said cable or connection cable from said fiber optic reader to a remote location.

10. Sealing system according to claim 6, said further communication means comprising encryption means for encrypting said status information.

* * * * *